(12) United States Patent
Wang et al.

(10) Patent No.: US 6,906,872 B2
(45) Date of Patent: Jun. 14, 2005

(54) LENS MODULE FOR A THIN SCANNING DEVICE

(75) Inventors: Yuan-Lin Wang, Hsinchu (TW); Roger Lien, Hsinchu (TW)

(73) Assignee: Microtek International, Inc., Hsinchu (TW)

( * ) Notice: Subject to any disclaimer, the term of this patent is extended or adjusted under 35 U.S.C. 154(b) by 0 days.

(21) Appl. No.: 10/753,735

(22) Filed: Jan. 7, 2004

(65) Prior Publication Data

US 2004/0145819 A1 Jul. 29, 2004

(30) Foreign Application Priority Data

Jan. 8, 2003 (TW) ........................................ 92100458 A (51) Int. Cl.⁷ .......................... G02B 13/04; G02B 9/60; H04N 1/04
(52) U.S. Cl. ........................ 359/753; 359/763; 358/474
(58) Field of Search ................................ 359/753, 763, 359/764, 770, 738, 740, 714, 691; 358/474, 475, 505

(56) References Cited

U.S. PATENT DOCUMENTS

| 4,394,073 A | * | 7/1983 | Wakamiya ................ 359/753 |
| 6,307,661 B1 | * | 10/2001 | Fujibayashi et al. ........ 358/474 |
| 2004/0125418 A1 | * | 7/2004 | Lien ......................... 358/474 |

* cited by examiner

*Primary Examiner*—Georgia Epps
*Assistant Examiner*—Alicia M. Harrington
(74) *Attorney, Agent, or Firm*—Merchant & Gould P.C.

(57) ABSTRACT

A lens module for a thin scanning device is to be disposed on an optical path from an original to an image sensor, and includes first to fifth lenses and a stop. The first lens has a focal length and a shape factor with identical signs, and is disposed to form an object distance with the original. The second lens has a focal length with a sign opposite to that of the focal length of the first lens, and a shape factor with a sign opposite to that of the shape factor of the first lens. The stop is disposed between the second and third lenses. The third lens has a positive focal length and a positive shape factor. The fourth lens has a positive focal length and a negative shape factor. The fifth lens has a negative focal length and a positive shape factor.

12 Claims, 11 Drawing Sheets

LENS MODULE FOR A THIN SCANNING DEVICE

CROSS-REFERENCE TO RELATED APPLICATION

This application claims priority of Taiwanese application no. 092100458, filed on Jan. 8, 2003.

BACKGROUND OF THE INVENTION

1. Field of the Invention

The invention relates to a lens module, more particularly to a lens module suitable for use in a thin scanning device.

2. Description of the Related Art

In recent years, scanning devices have been used quite widely. While functionality of scanning devices has increased, the trend is still to miniaturize the size thereof. The size of a scanning device depends on the size of a lens module, which serves to project an image of an original onto an image sensor, within the scanning device.

At present, a critical factor that determines the size of the lens module is the total length of an optical path and the back focal length. If the total length of the lens module or the back focal length is relatively long, the overall size of the lens module will definitely be larger. Attempts to reduce the total length so as to reduce the size of the scanning device necessitates the design of a lens module that can match the reduced total length in order to achieve a satisfactory imaging quality.

U.S. Pat. Nos. 5,386,312, 5,731,915, 6,014,262, 6,147,811 and 6,208,474 have disclosed lens modules of various types. However, due to limitations posed by optical design techniques and lens manufacturing techniques, the lens modules disclosed in the aforesaid patents are not able to meet the requirements for a reduced total length and a satisfactory imaging quality.

SUMMARY OF THE INVENTION

Therefore, the main object of the present invention is to provide a lens module for use in a thin scanning device.

Another object of the present invention is to provide a scanning device that incorporates the lens module of this invention.

According to a first aspect of the invention, there is provided a lens module for a thin scanning device. The lens module is to be disposed on an optical path from an original to an image sensor. The optical path includes a chief ray at zero-field propagating from a zero-field of the original to a zero-field of the image sensor. A chief ray at full-field propagates from a full-field of the original to a full-field of the image sensor. The lens module is to be disposed between the original and the image sensor such that the chief ray at zero-field and the chief ray at full-field form an angle greater than 30 degrees therebetween at a side between the lens module and the image sensor. The optical path has a total length measured from the original to the image sensor. The lens module forms an object distance with the original. The total length is less than 1.5 times the object distance. An object height of the original when imaged on the image sensor is defined as an image height. The total length is less than five times the image height. The lens module comprises, in sequence from the original to the image sensor along the optical path:

a first lens having a focal length and a shape factor with identical signs, and disposed to form the object distance with the original;

a second lens having a focal length with a sign opposite to that of the focal length of the first lens, and a shape factor with a sign opposite to that of the shape factor of the first lens;

a stop having a center and disposed such that the chief ray at zero-field and the chief ray at full-field pass through the center of the stop;

a third lens with a positive focal length and a positive shape factor;

a fourth lens with a positive focal length and a negative shape factor; and a fifth lens with a negative focal length and a positive shape factor;

one of the first, second, third, fourth, and fifth lenses having a largest diameter and two opposite surfaces, the two opposite surfaces having curvature centers with identical signs;

a ratio of a diameter of the stop to that of the fifth lens being less than 0.5.

According to a second aspect of the invention, a scanning device comprises:

a transparent window adapted for placement of an original;

a light source proximate to the transparent window;

an image sensor disposed to form an optical path with the transparent window, the optical path including a chief ray at zero-field propagating from a zero-field of the original to a zero-field of the image sensor, a chief ray at full-field propagating from a full-field of the original to a full-field of the image sensor; and a lens module disposed between the transparent window and the image sensor such that the chief ray at zero-field and the chief ray at full-field form an angle greater than 30 degrees therebetween at a side between the lens module and the image sensor.

The optical path has a total length measured from the original to the image sensor. The lens module forms an object distance with the original. The total length is less than 1.5 times the object distance. An object height of the original when imaged on the image sensor is defined as an image height. The total length is less than five times the image height.

The lens module includes, in sequence from the transparent window to the image sensor along the optical path:

a first lens having a focal length and a shape factor with identical signs, and disposed to form the object distance with the original;

a second lens having a focal length with a sign opposite to that of the focal length of the first lens, and a shape factor with a sign opposite to that of the shape factor of the first lens;

a stop having a center and disposed such that the chief ray at zero-field and the chief ray at full-field pass through the center of the stop;

a third lens with a positive focal length and a positive shape factor;

a fourth lens with a positive focal length and a negative shape factor; and a fifth lens with a negative focal length and a positive shape factor.

One of the first, second, third, fourth, and fifth lenses has a largest diameter and two opposite surfaces, the two opposite surfaces having curvature centers with identical signs.

A ratio of a diameter of the stop to that of the fifth lens is less than 0.5.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
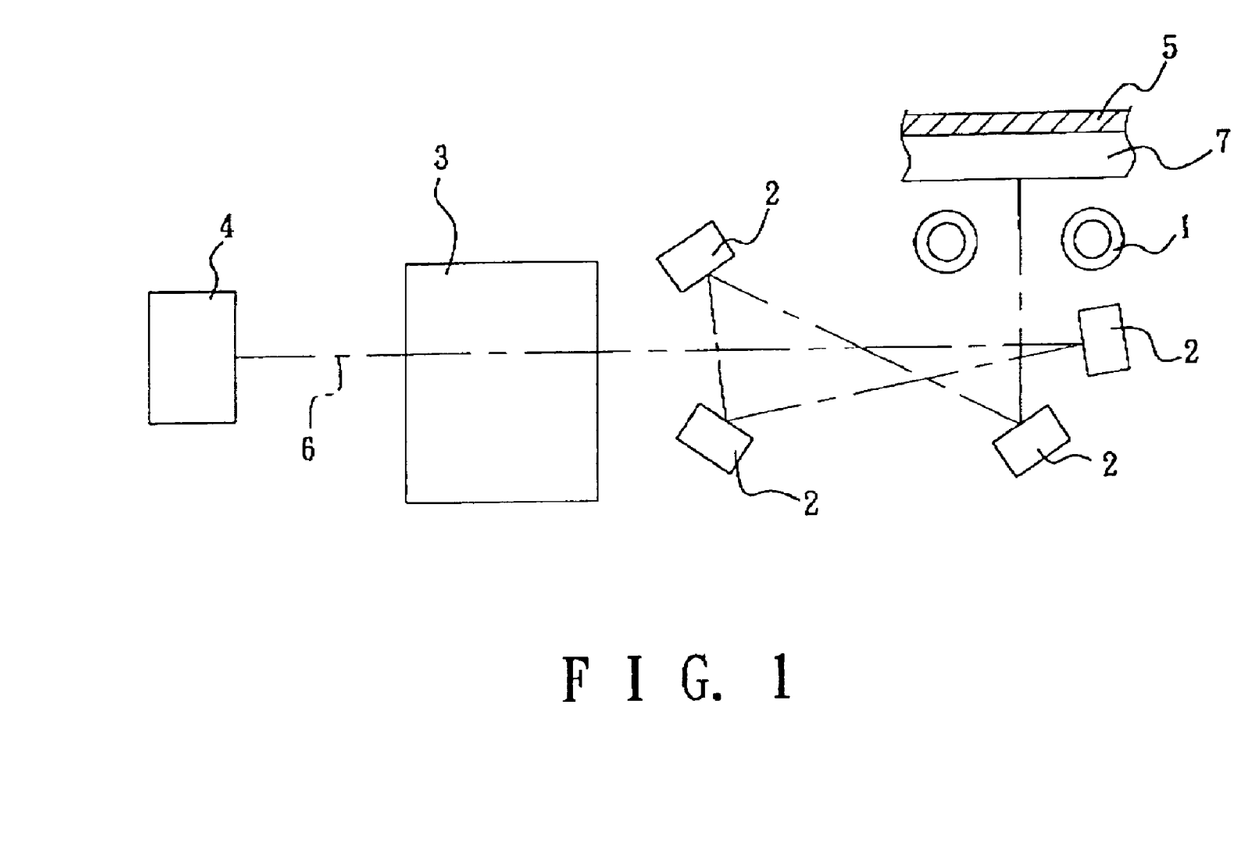
FIG. 1 is a fragmentary schematic view showing the internal construction of a thin scanning device incorporating the first preferred embodiment of a lens module according to this invention.

FIG. 1 is a fragmentary schematic view showing the internal construction of a thin scanning device employing a lens module 3 according to the present invention. As shown, the thin scanning device includes a transparent window 7 adapted for placement of an original 5 thereon, a light source 1 proximate to the transparent window 7, a charge coupled device (CCD) image sensor 4 disposed to form an optical path 6 with the transparent window 7, and four reflecting mirrors 2 disposed between the transparent window 7 and the image sensor 4 for forming the optical path 6. The first preferred embodiment of the lens module 3 is used in the scanning device, in which the transparent window 7 is a glass window of 3 mm in thickness, and the image sensor 4 has a chip (not shown), and a cover glass (not shown) disposed at a front end of the chip and having a thickness of 0.7 mm.

Figure 2:
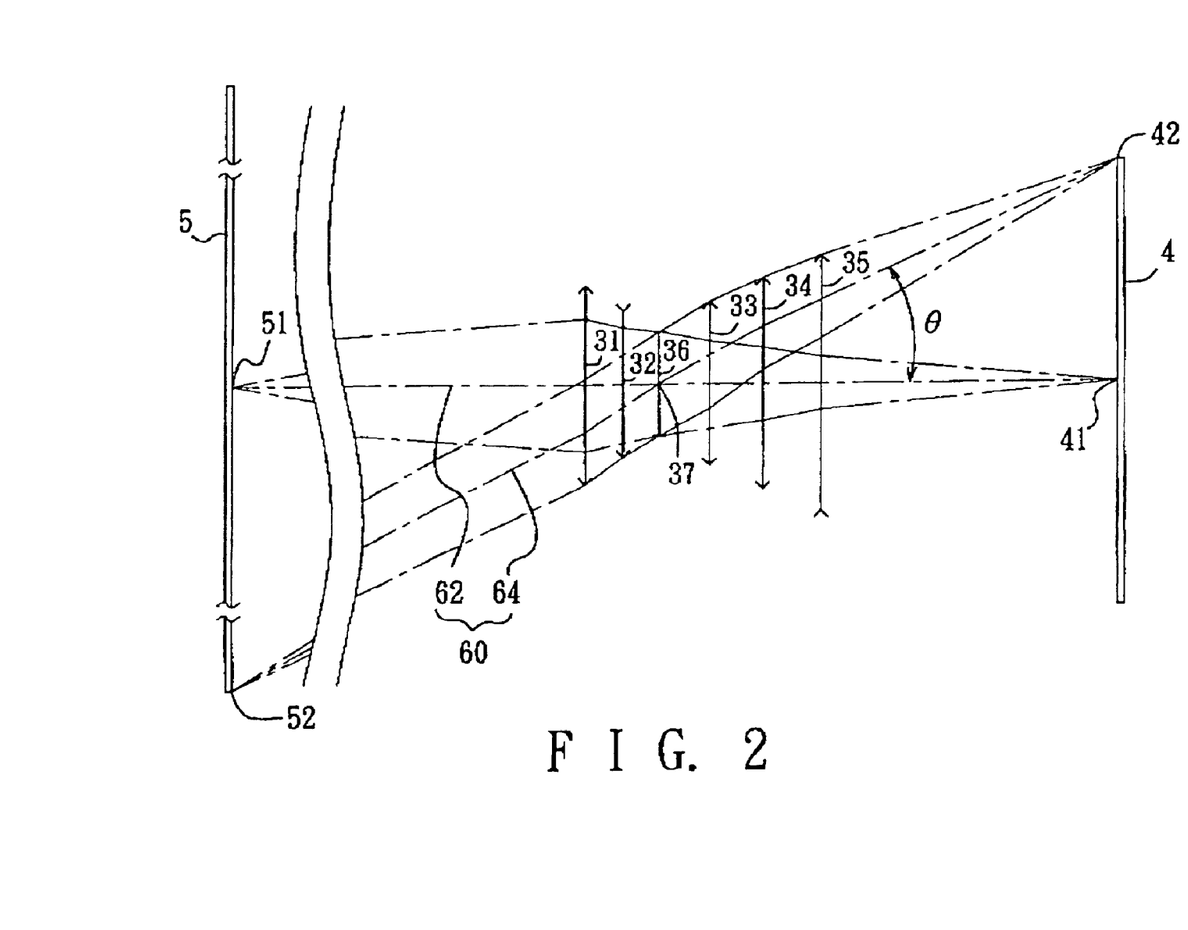
FIG. 2 is a simplified schematic view of the first preferred embodiment of the lens module according to this invention.
Figure 3:
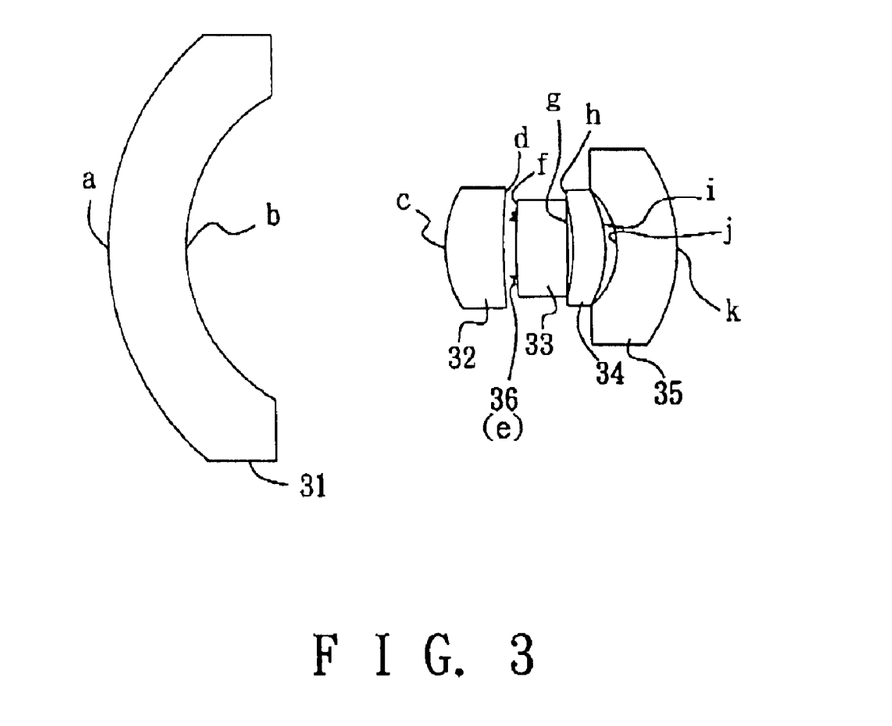
FIG. 3 is a schematic view of the first preferred embodiment of the lens module according to this invention.

With further reference to FIG. 2 (in which the transparent window 7 and the cover glass of the image sensor 4 are omitted for convenience of illustration) in combination with FIG. 3, the first preferred embodiment of the lens module 3 according to this invention includes a first lens 31 proximate to the original 5, a second lens 32 disposed on one side of the first lens 31 which is distal from the original 5, a third lens 33 disposed on one side of the second lens 32 which is distal from the original 5, a fourth lens 34 disposed on one side of the third lens 33 which is distal from the original 5, a fifth lens 35 disposed on one side of the fourth lens 34 which is distal from the original 5, and a stop 36 with a center 37 and disposed between the second and third lenses 32, 33. It will be apparent hereinafter that the characteristics of the first, second, third, fourth and fifth lenses 31, 32, 33, 34, 35, and the stop 36 may vary depending on design requirements.

The optical path 6 includes a plurality of light rays 60 passing through the stop 36 and including a chief ray 62 at zero-field propagating from a zero-field (center) 51 of the original 5 to a zero-field (center) 41 of the image sensor 4. A chief ray 64 at full-field propagates from a full-field (edge) 52 of the original 5 to a full-field (edge) 42 of the image sensor 4. The optical path 6 has a total length (TT) measured from the original 5 to the image sensor 4. The lens module 3 forms an object distance (P) with the original 5. An object height of the original 5 when imaged on the image sensor 4 is defined as an image height (IMA).

In use, when the light source 1 illuminates the original 5, light rays 60 reflected from the original 5 and carrying information of an image (not shown) on the original 5 pass through the transparent window 7 and propagate along the optical path 6 formed by the reflecting mirrors 2 and the lens module 3 for forming an image on the image sensor 4, which converts the image information into electrical signals in a known manner.

The lens shape can be characterized by a shape factor. The greater the absolute value of the shape factor of a lens, the greater will be the curvature of the surface of the lens. To facilitate description, a surface of lens having a center of curvature relatively close to the image sensor 4 is defined herein as a positive radius, whereas a surface of lens having a center of curvature relatively close to the original 5 is defined herein as a negative radius. In addition, the first and second lenses 31, 32 that are interposed between the stop 36 and the original 5 are defined as a front lens group, whereas the third, fourth and fifth lenses 33, 34, 35 that are interposed between the stop 36 and the image sensor 4 are defined as a rear lens group.

By adjusting the parameters of the constituting elements of the lens module 3 (such as the curvature center and diameter of each of the lenses 31, 32, 33, 34, 35, the size of the stop 36, the angle between the chief ray 64 at full-field and the chief ray 62 at zero-field, the image height (IMA), the correlation between the total length (TT) and the object distance (P), etc.), and with the aid of optical simulation software and with consideration given to the actual arrangement and the effects intended to be achieved, it is found that the lens module 3 of this invention should satisfy the following conditions:

(1) The lens module 3 is disposed between the transparent window 7 and the image sensor 4 such that the chief ray 62 at zero-field and the chief ray 64 at full-field form an angle (θ) greater than 30 degrees therebetween at a side between the lens module 3 and the image sensor 4;

(2) The total length (TT) is less than 1.5 times the object distance (P);

(3) The total length (TT) is less than five times the image height (IMA);

(4) The first lens 31 in the front lens group has a focal length and a shape factor with identical signs, and is disposed to form the object distance (P) with the original 5. The second lens 32 in the front lens group has a focal length with a sign opposite to that of the focal length of the first lens 31, and a shape factor with a sign opposite to that of the shape factor of the first lens 31. The third, fourth and fifth lenses 33, 34 and 35 in the rear lens group have positive, positive and negative focal lengths, respectively, and have positive, negative, and positive shape factors, respectively.

(5) The stop 36 is disposed such that the chief ray 62 at zero-field and the chief ray 64 at full-field pass through the center 37 of the stop 36.

(6) One of the first, second, third, fourth and fifth lenses 31, 32, 33, 34, 35 has a largest diameter and two opposite surfaces, the two opposite surfaces having curvature centers with identical signs.

(7) A ratio of a diameter of the stop 36 to that of the fifth lens 35 is less than 0.5.

The first preferred embodiment of the lens module 3 as applied to a scanning device (such as a Toshiba 2950 CCD image sensor with 1200 DPI, 4 μm, interlaced into 2,400 DPI, 21,432 pixels) will be described in detail hereinbelow. The parameters of the first preferred embodiment of the lens module 3 are set forth below in Table 1.

TABLE 1

| Surface No. | R | D | N | υ |
|---|---|---|---|---|
| a | 7.937 | 1.21 | 1.84 | 42.7 |
| b | 13.950 | 0.29 | | |
| c | −698.309 | 0.7 | 1.76 | 26.5 |
| d | 10.577 | 0.26 | | |
| e | ∞ (stop) | 0.1 | | |
| f | 12.735 | 2.72 | 1.84 | 42.7 |
| g | −23.227 | 0.29 | | |
| h | −11.244 | 5.19 | 1.84 | 28.6 |
| i | −10.564 | 3.46 | | |
| j | −6.097 | 1.39 | 1.72 | 28.0 |
| k | −12.943 | | | | wherein: R is the radius of curvature of each lens surface in units of mm; D is the distance (center thickness of each lens or the air gap between adjacent lenses) between neighboring lens surfaces and is in units of mm; N is the refractive index of each lens; and υ is the Abbe number of each lens.

In this embodiment, the object distance (P) from the original 5 to the first lens 31 is 155.15 mm. The total length (TT) is 190 mm. The focal lengths of the first, second, third, fourth and fifth lenses 31, 32, 33, 34, 35 are 21.95, −13.60, 9.80, 205.94, and −15.78, respectively. The shape factors of the first, second, third, fourth and fifth lenses 31, 32, 33, 34, 35 are 3.64, −0.97, 0.29, −32.09, and 2.78, respectively. The fifth lens 35 has the largest diameter, 12.92 mm, and the curvature centers of both surfaces thereof are −6.08 and −12.94, respectively. The diameter of the stop 36 is 3.6 mm. The ratio of the diameter of the stop 36 (3.6 mm) to the diameter of the fifth lens 35 (12.92 mm) is 0.28, which is less than 0.5, thereby satisfying the aforesaid condition (7).

In addition, in this embodiment, the angle (θ) between the chief ray 64 at full-field that is proximate to the image sensor 4 and the chief ray 62 at zero-field is 39.53 degrees, which is greater than 30 degrees, thereby satisfying the aforesaid condition (1). The total length (TT) of 190 mm is less than 1.5 times the object distance. (P) of 155.15 mm, which satisfies the aforesaid condition (2). Besides, the total length (TT) of 190 mm is less than five times the image height (IMA) of 40.8 mm, which satisfies the aforesaid condition (3).

Figure 4A:
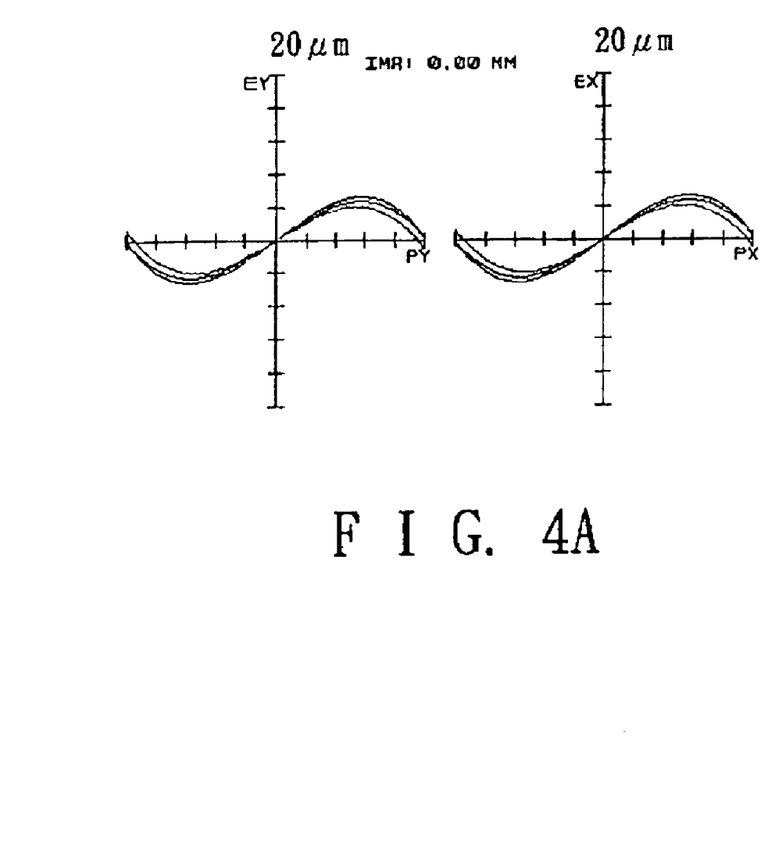
FIGS. 4A and 4B are ray fan plots of the first preferred embodiment.
Figure 4B:
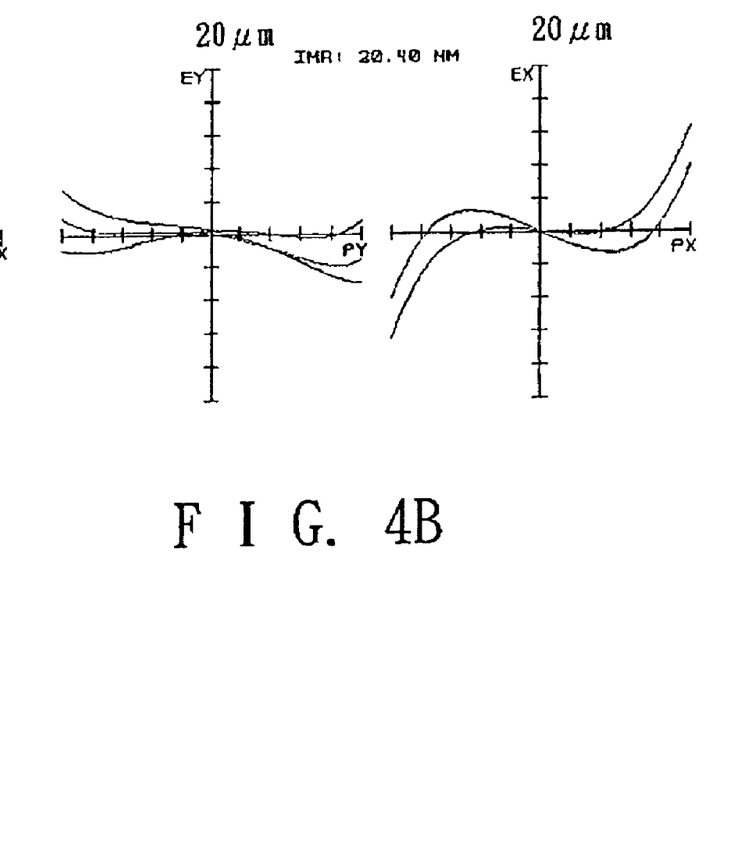

FIGS. 4A and 4B are ray fan plots showing aberrations of the first preferred embodiment of the lens module 3 according to this invention. In these figures, the largest scale is 20±μm, and PX and PY respectively represent size of the stop 36 in the X-direction and the Y-direction. FIG. 4A, in which the image height (IMA) is 0 mm, illustrate spherical aberrations of the first preferred embodiment. FIG. 4B, in which the image height (IMA) is 20.40 mm, illustrate off-axis aberrations of the first preferred embodiment. In these figures, EY represents sagittal aberration, while EX represents tangential aberration. As it can be noted that the off-axis aberration is below 20 μm, the first preferred embodiment of the lens module 3 according to this invention is capable of providing a satisfactory image quality.

Figure 5A:
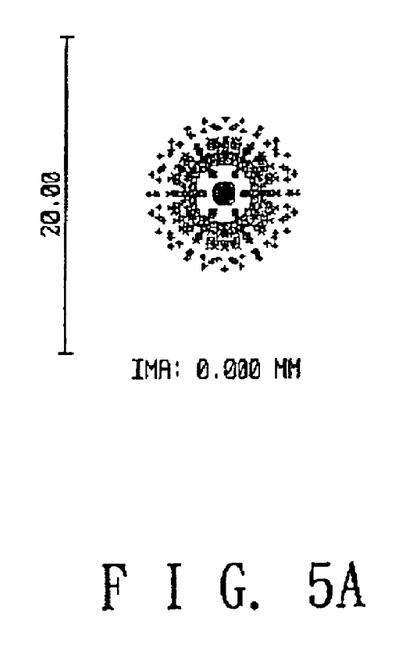
FIGS. 5A and 5B are spot diagrams of the first preferred embodiment.
Figure 5B:
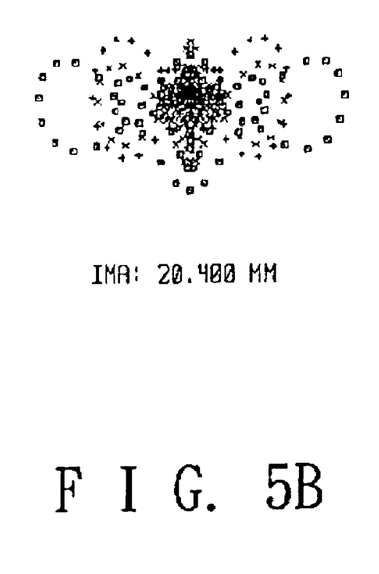
Figure 6:
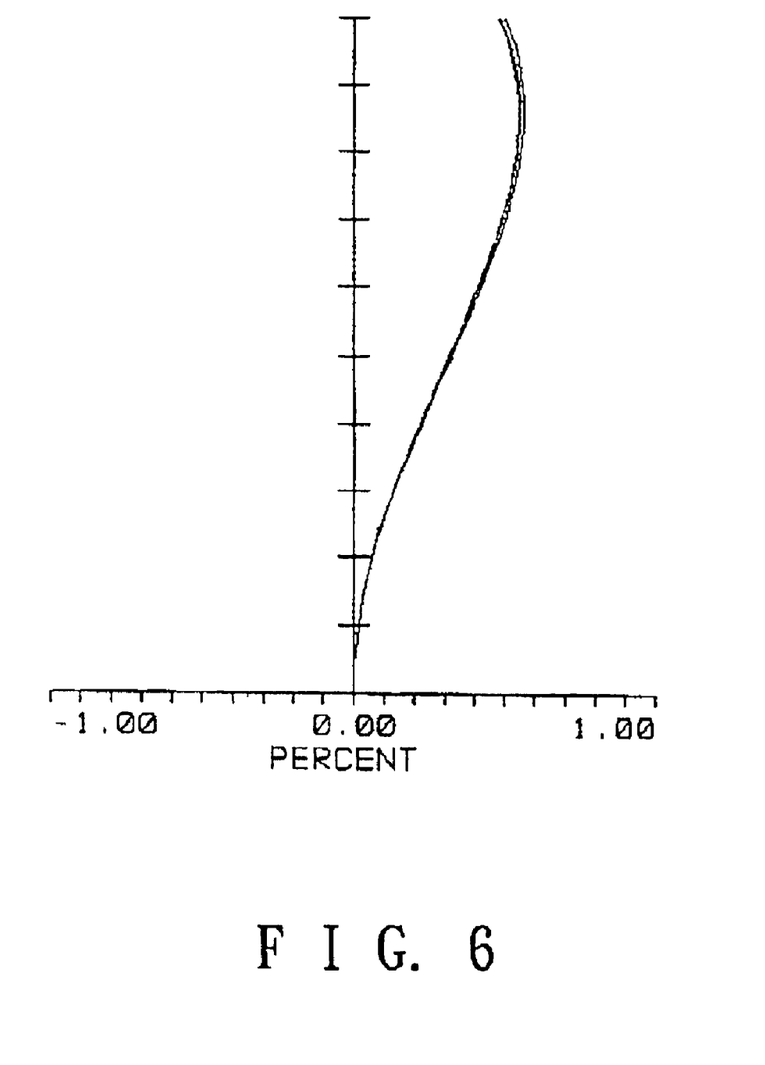
FIG. 6 illustrates distortion attributed to the first preferred embodiment.

FIGS. 5A and 5B are spot diagrams of the first preferred embodiment of the lens module 3 according to this invention, illustrating respectively the sizes of the image points at the center and edge of the imaging surface of the image sensor 4. In this embodiment, the cell size of the image sensor 4 is 4 μm, and the sizes of the image points of the lens module 3 at the center and the edge of the imaging surface of the image sensor 4 are 2.9 μm and 3.1 μm, respectively, which indicates that the imaging quality is quite satisfactory. FIG. 6 illustrates distortion aberration attributed to the first preferred embodiment of the lens module 3 according to this invention. As shown, the distortion in this embodiment is less than 1%, which is quite satisfactory.

Figure 7:
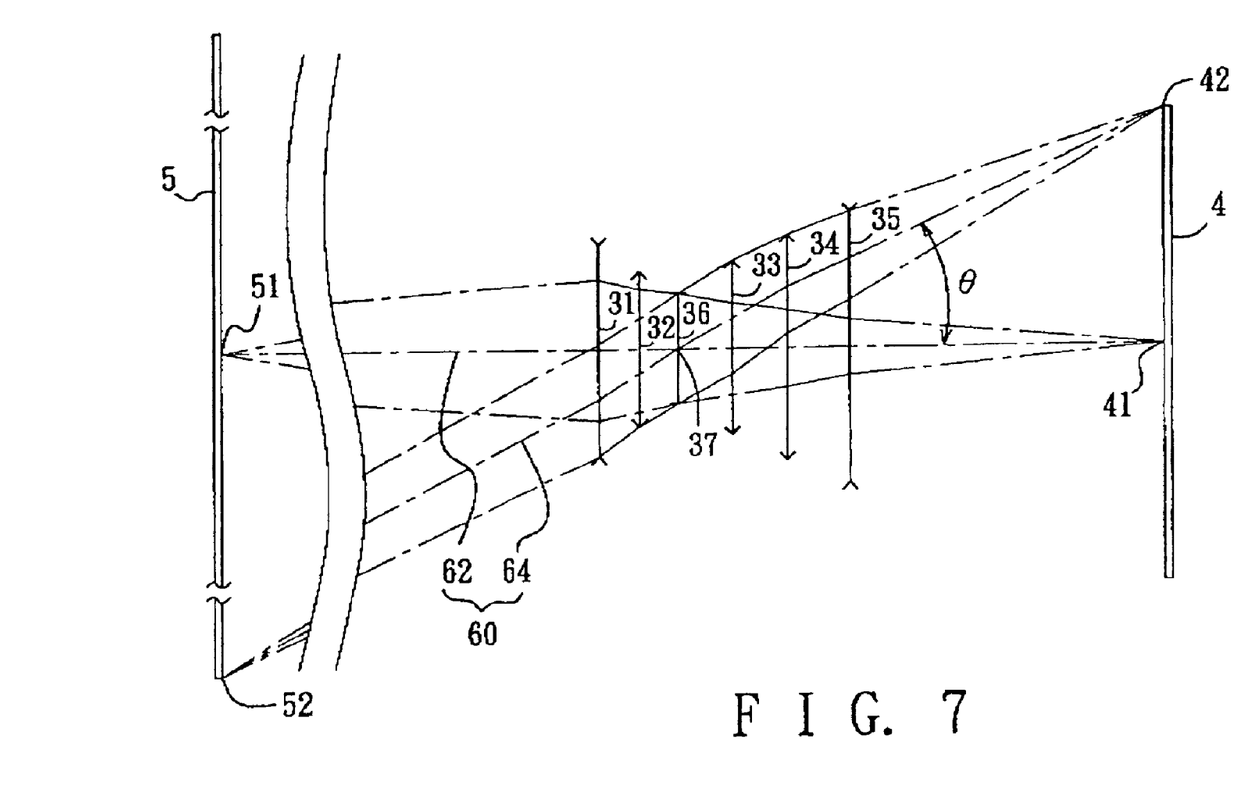
FIG. 7 is a simplified schematic view of the second preferred embodiment of a lens module according to this invention.

FIG. 7 is a simplified schematic view of the second preferred embodiment of the lens module 3 according to this invention. It is noted that the transparent window 7 and the cover glass of the image sensor 4 are also omitted therein for the sake of simplicity. In addition, the arrangement and definitions of the lens module 3 are the same as those in the first preferred embodiment.

Figure 8:
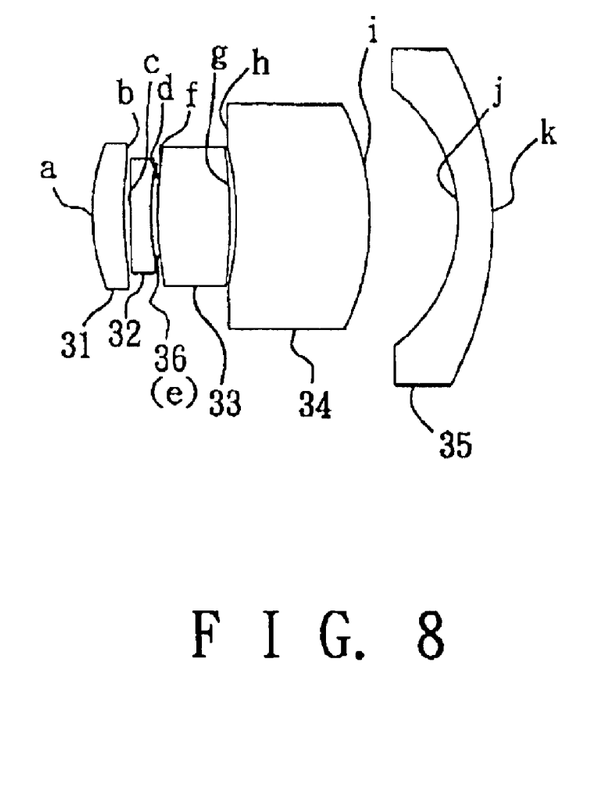
FIG. 8 is a schematic view of the second preferred embodiment of the lens module according to this invention.

With further reference to FIG. 8, the second preferred embodiment of the lens module 3 likewise can satisfy the conditions (1) to (7) set forth hereinabove, and is incorporated in a scanning device, such as a Toshiba 2950 CCD image sensor (1,200 DPI, 4 μm, interlaced into 2,400 DPI, 21,432 pixels). Table 2 sets forth the parameters of the second preferred embodiment of the lens module 3 of this invention.

TABLE 2

| Surface No. | R | D | N | υ |
|---|---|---|---|---|
| a | 18.160 | 5.05 | 1.74 | 27.2 |
| b | 11.558 | 16.70 | | |
| c | 7.252 | 3.89 | 1.64 | 59.0 |
| d | 13.458 | 0.64 | | |
| e | ∞ (stop) | 0.14 | | |
| f | 24.409 | 3.37 | 1.71 | 54.0 |
| g | −61.952 | 0.36 | | |
| h | −13.154 | 2.10 | 1.55 | 62.3 |
| i | −7.015 | 0.81 | | |
| j | −4.689 | 3.96 | 1.85 | 23.8 |
| k | −10.177 | | | | wherein the definitions of R, D, N, and υ, as well as the units of R and D, are the same as those in the first preferred embodiment.

In this embodiment, the distance from the original 5 to the first lens 31 (object distance P) is 130.58 mm. The total length (TT) is 190 mm. The focal lengths of the first, second, third, fourth and fifth lenses 31, 32, 33, 34, 35 are −42.43, 24.68, 24.56, 27.16, and −10.18, respectively. The shape factors of the first, second, third, fourth and fifth lenses 31, 32, 33, 34, 35 are −4.50, 3.34, 0.43, −3.29, and 2.71, respectively. The first lens 31 has the largest diameter, and the curvature centers of both surfaces of the first lens 31 are 18.160 and 11.558, respectively, both being positive. In addition, the diameter of the stop 36 is 3.62 mm. The ratio of the diameter of the stop 36 to the diameter of the fifth lens

35 (12.46 mm) is 0.29, which is less than 0.5, thereby satisfying the aforesaid condition (7).

In this embodiment, the angle (θ) between the chief ray 64 at full-field proximate to the image sensor 4 and the chief ray 62 at zero-field is 35.55 degrees, which is greater than 30 degrees and therefore satisfies the aforesaid condition (1). In addition, the total length (TT) of 190 mm is less than 1.5 times the object distance (P) of 130.58 mm, which satisfies the aforesaid condition (2). Besides, the total length (TT) is less than five times the image height (IMA), which satisfies the aforesaid condition (3).

Figure 9A:
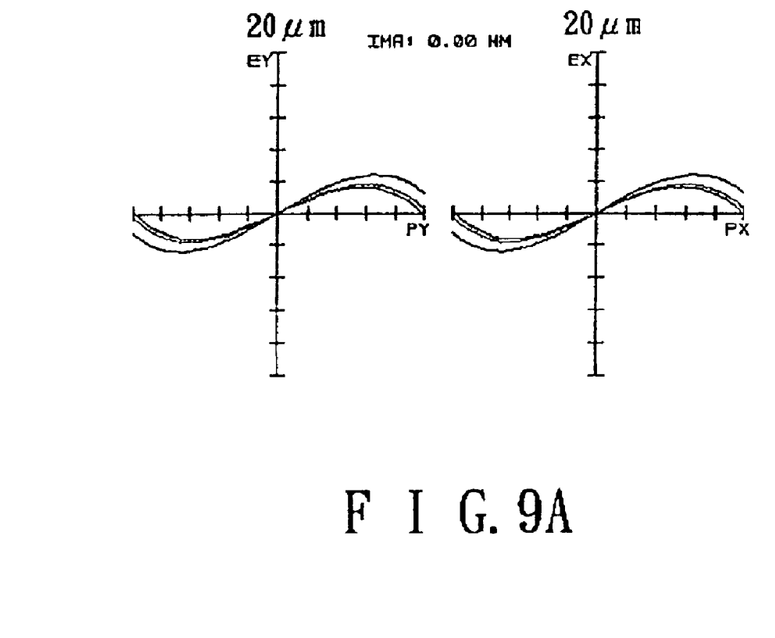
FIGS. 9A and 9B are ray fan plots of the second preferred embodiment.
Figure 9B:
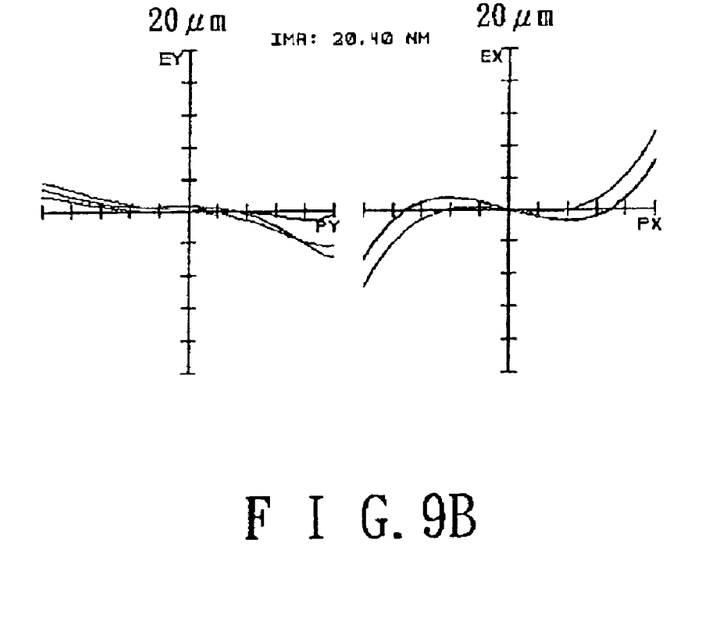

FIGS. 9A and 9B are ray fan plots showing aberrations of the second preferred embodiment of the lens module 3 according to this invention. As shown, the off-axis aberration of the lens module 3 is below 20 μm. Hence, the second preferred embodiment likewise can achieve a satisfactory effect.

Figure 10A:
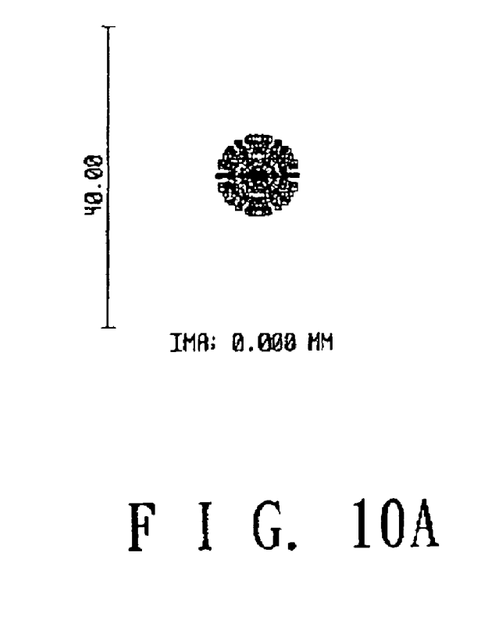
FIGS. 10A and 10B are spot diagrams of the second preferred embodiment.
Figure 10B:
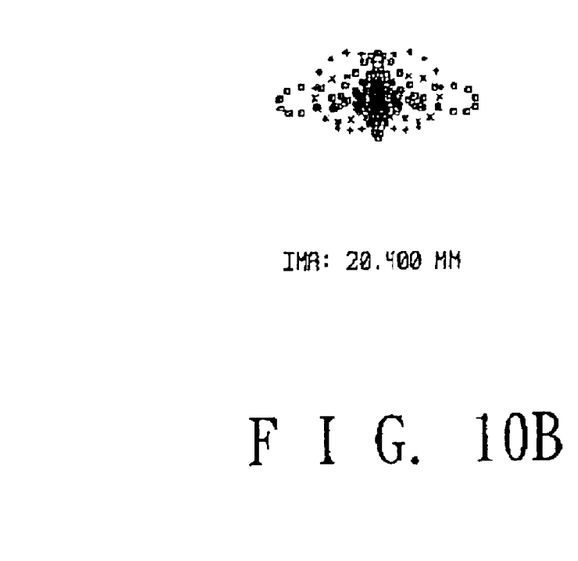

FIGS. 10A and 10B are spot diagrams of the second preferred embodiment of the lens module 3 according to this invention, illustrating respectively the sizes of the image points at the center and edge of the imaging is surface of the image sensor 4. In this embodiment, the cell size of the image sensor 4 is 4 μm, whereas the sizes of the image points of the lens module 3 at the center and edge of the imaging surface are 3.2 μm and 4.0 μm, respectively, indicating a good imaging quality.

Figure 11:
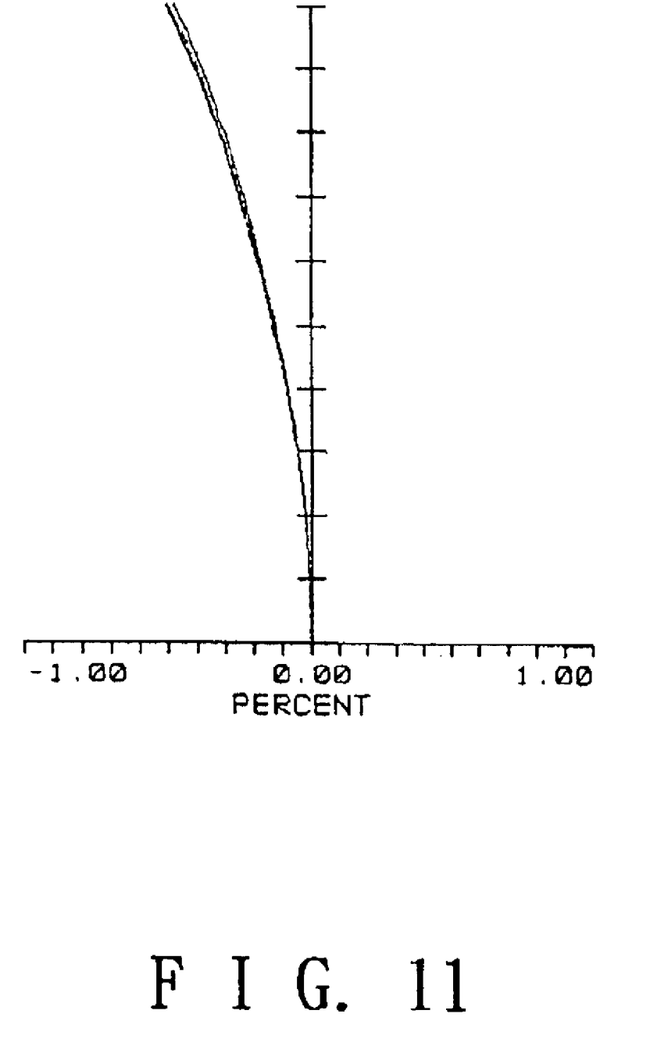
FIG. 11 illustrates distortion attributed to the second preferred embodiment.

FIG. 11 shows distortion aberration attributed to the second preferred embodiment of the lens module 3 according to this invention. As illustrated, the distortion aberration in this embodiment is also less than 1%, indicating a satisfactory image quality.

In summary, a lens module suitable for use in a thin scanning device and capable of providing satisfactory imaging results can be designed based on the aforesaid conditions, and optionally with the help of optical simulation software. Furthermore, a scanning device incorporating the lens module of this invention and designed according to the aforesaid conditions can have a reduced thickness While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A lens module for a thin scanning device, said lens module to be disposed on an optical path from an original to an image sensor, the optical path including a chief ray at zero-field propagating from a zero-field of the original to a zero-field of the image sensor, a chief ray at full-field propagating from a full-field of the original to a full-field of the image sensor, said lens module to be disposed between the original and the image sensor such that the chief ray at zero-field and the chief ray at full-field form an angle greater than 30 degrees therebetween at a side between said lens module and the image sensor, the optical path having a total length measured from the original to the image sensor, said lens module forming an object distance with the original, the total length being less than 1.5 times the object distance, an object height of the original when imaged on the image sensor being defined as an image height, the total length being less than five times the image height, said lens module comprising, in sequence from the original to the image sensor along the optical path:

a first lens having a focal length and a shape factor with identical signs, and disposed to form the object distance with the original;

a second lens having a focal length with a sign opposite to that of the focal length of said first lens, and a shape factor with a sign opposite to that of the shape factor of said first lens;

a stop having a center and disposed such that the chief ray at zero-field and the chief ray at full-field pass through said center of said stop;

a third lens with a positive focal length and a positive shape factor;

a fourth lens with a positive focal length and a negative shape factor; and a fifth lens with a negative focal length and a positive shape factor;

one of said first, second, third, fourth, and fifth lenses having a largest diameter and two opposite surfaces, said two opposite surfaces having curvature centers with identical signs;

a ratio of a diameter of said stop to that of said fifth lens being less than 0.5.

2. The lens module as claimed in claim 1, wherein said first lens has a positive focal length and a positive shape factor, and said second lens has a negative focal length and a negative shape factor.

3. The lens module as claimed in claim 1, wherein said first lens has a negative focal length and a negative shape factor, and said second lens has a positive focal length and a positive shape factor.

4. The lens module as claimed in claim 1, wherein the ratio of the diameter of said stop to that of said fifth lens ranges from 0.28 to 0.29.

5. A scanning device comprising:

a transparent window adapted for placement of an original;

a light source proximate to said transparent window;

an image sensor disposed to form an optical path with said transparent window, said optical path including a chief ray at zero-field propagating from a zero-field of the original to a zero-field of said image sensor, a chief ray at full-field propagating from a full-field of the original to a full-field of said image sensor; and a lens module disposed between said transparent window and said image sensor such that the chief ray at zero-field and the chief ray at full-field form an angle greater than 30 degrees therebetween at a side between said lens module and said image sensor;

said optical path having a total length measured from the original to said image sensor, said lens module forming an object distance with the original, the total length being less than 1.5 times the object distance, an object height of the original when imaged on said image sensor being defined as an image height, the total length being less than five times the image height;

said lens module including, in sequence from said transparent window to said image sensor along said optical path:

a first lens having a focal length and a shape factor with identical signs, and disposed to form the object distance with the original;

a second lens having a focal length with a sign opposite to that of the focal length of said first lens, and a shape factor with a sign opposite to that of the shape factor of said first lens;

a stop having a center and disposed such that the chief ray at zero-field and the chief ray at full-field pass through said center of said stop;

a third lens with a positive focal length and a positive shape factor;

a fourth lens with a positive focal length and a negative shape factor; and a fifth lens with a negative focal length and a positive shape factor;

one of said first, second, third, fourth, and fifth lenses having a largest diameter and two opposite surfaces, said two opposite surfaces having curvature centers with identical signs;

a ratio of a diameter of said stop to that of said fifth lens being less than 0.5.

6. The scanning device as claimed in claim 5, further comprising a plurality of reflecting mirrors disposed between said transparent window and said image sensor for forming said optical path.

7. The scanning device as claimed in claim 5, wherein said first lens has a positive focal length and a positive shape factor, and said second lens has a negative focal length and a negative shape factor.

8. The scanning device as claimed in claim 5, wherein said first lens has a negative focal length and a negative shape factor, and said second lens has a positive focal length and a positive shape factor.

9. The scanning device as claimed in claim 5, wherein the ratio of the diameter of said stop to that of said fifth lens ranges from 0.28 to 0.29.

10. The scanning device as claimed in claim 5, wherein the angle formed between said chief ray at zero-field and said chief ray at full-field ranges from 36 to 37 degrees.

11. The scanning device as claimed in claim 5, wherein the total length is from 1.22 to 1.46 times the object distance.

12. The scanning device as claimed in claim 5, wherein the total length is 4.66 times the image height.

* * * * *